United States Patent
Kanegae (10) Patent No.: US 9,340,020 B2
(45) Date of Patent: May 17, 2016

(54) LIQUID EJECTING HEAD UNIT AND LIQUID EJECTING APPARATUS

(71) Applicant: Seiko Epson Corporation, Tokyo (JP)

(72) Inventor: Takahiro Kanegae, Shiojiri (JP)

(73) Assignee: Seiko Epson Corporation (JP)

( * ) Notice: Subject to any disclaimer, the term of this patent is extended or adjusted under 35 U.S.C. 154(b) by 31 days.

(21) Appl. No.: 14/302,911

(22) Filed: Jun. 12, 2014

(65) Prior Publication Data

US 2014/0375727 A1 Dec. 25, 2014

(30) Foreign Application Priority Data

Jun. 20, 2013 (JP) ................................. 2013-129336

(51) Int. Cl.
 *B41J 2/165* (2006.01)
 *B41J 2/14* (2006.01)

(52) U.S. Cl.
 CPC *B41J 2/1433* (2013.01); *B41J 2/14* (2013.01); *B41J 2002/14362* (2013.01); *B41J 2002/14403* (2013.01)

(58) Field of Classification Search
 None
 See application file for complete search history.

(56) References Cited

U.S. PATENT DOCUMENTS

| 8,419,173 | B2* | 4/2013 | Hayashi et al. ................ | 347/85 |
| 2003/0151645 | A1 | 8/2003 | Yamada et al. | |
| 2008/0043059 | A1 | 2/2008 | Okazawa et al. | |
| 2010/0214379 | A1* | 8/2010 | Owaki et al. .................. | 347/85 |
| 2012/0182363 | A1* | 7/2012 | Watanabe ...................... | 347/85 |

FOREIGN PATENT DOCUMENTS

| JP | 2003-305873 A | 10/2003 |
| JP | 2009-006730 A | 1/2009 |

* cited by examiner

*Primary Examiner* — Alejandro Valencia
(74) *Attorney, Agent, or Firm* — Harness, Dickey & Pierce, P.L.C.

(57) ABSTRACT

A head unit includes a head, an upstream member with an upstream passage supplied with liquid, a downstream member with a downstream passage communicating with the upstream passage and supplying liquid to the head, an elastic sealer connecting the upstream and downstream passages, and including a tube with a connection passage, and a support between the sealer and the downstream member. In the head unit, the upstream member and the sealer apply pressure in a penetration direction of the connection passage and hermetically seal the upstream passage, the sealer and the downstream member apply pressure in a direction perpendicular to the penetration direction of the tube and hermetically seal the downstream passage, and the support abuts a region on a surface of the sealer, the surface being opposite the upstream member, the region overlapping a region to which the sealer and the upstream member apply pressure.

3 Claims, 4 Drawing Sheets

LIQUID EJECTING HEAD UNIT AND LIQUID EJECTING APPARATUS

BACKGROUND

1. Technical Field

The present invention relates to a liquid ejecting head unit that ejects liquid from a nozzle and a liquid ejecting apparatus, and particularly relates to an ink jet recording head unit that discharges ink as liquid and an ink jet recording apparatus.

2. Related Art

Representative examples of a liquid ejecting head unit that ejects liquid include an ink jet recording head unit that discharges drops of ink. For example, JPA-2009-6730 proposes an ink jet recording head unit that includes an ink jet recording head, which discharges drops of ink from a nozzle, and a passage member, which is fixed to the ink jet recording head and supplies ink from a liquid reservoir in which the ink is stored, such as an ink cartridge, to a liquid ejecting head.

The passage member of the ink jet recording head unit includes an upstream passage member, to which the ink is supplied from the liquid reservoir, and a downstream passage member, which holds the ink jet recording head and supplies the ink from the upstream passage member to the ink jet recording head. The passage member performs hermetic sealing so as to prevent the ink from leaking from a connection passage by causing a sealing member made of a plate-like elastic material, such as a sheet, to be pinched between the upstream passage member and the downstream passage member.

However, when it is attempted to hermetically seal the passage in which the upstream passage member and the downstream passage member are connected using the sealing member pinched between two members and made of an elastic material, such as a rubber sheet, repulsion based on elastic deformation of the sealing member may cause pressure to be applied in a direction in which the upstream passage member and the downstream passage member are separated from each other, and pressure may be applied in a direction perpendicular to a liquid ejecting surface that discharges the drops of ink of the liquid ejecting head. As a result, a malfunction may occur, such as separation of the passage member and the liquid ejecting head, separation of a layer member that is a constituent of the liquid ejecting head, or deviation from positions at which the drops of ink are expected to be supplied on an ejected medium, which is caused by warping of the liquid ejecting surface of the liquid ejecting head.

In contrast, JP-A-2003-305873 proposes a structure in which two passages are connected through a tube. Although the connection of two passages through a tube may reduce pressure in a direction perpendicular to a liquid ejecting surface, it is necessary to fit the tube to both an upper passage and a lower passage and assembling may be complicated.

Besides, in both cases in which the plate-like sealing member is used and the tube-like sealing member is used, it is necessary to press the upstream passage member relatively against the downstream passage member in assembling the upstream passage member and the downstream passage member, and the pressing may cause pressure to be applied in the direction in which the upstream passage member and the downstream passage member are separated from each other.

Similar to the ink jet recording head unit, the liquid ejecting head unit that ejects liquid other than ink also has such possibilities.

An advantage of some aspects of the invention is to propose a liquid ejecting head unit and a liquid ejecting apparatus, which enable passages to be connected preferably and improve assembility.

SUMMARY

According to a first aspect of the invention, a liquid ejecting head unit includes a liquid ejecting head that drives a pressure generator and discharges liquid from a nozzle, an upstream passage member with an upstream passage to which liquid is supplied from a liquid retaining portion that retains liquid, a downstream passage member with a downstream passage that communicates with the upstream passage of the upstream passage member and supplies liquid to the liquid ejecting head, a sealing member that connects the upstream passage of the upstream passage member and the downstream passage of the downstream passage member, includes a tubular portion provided inside with a connection passage through which liquid flows, and is made of an elastic material, and a support portion provided between the sealing member and the downstream passage member. In the liquid ejecting head unit, the upstream passage member and the sealing member apply pressure in a penetration direction of the connection passage of the tubular portion and hermetically seal the upstream passage, the sealing member and the downstream passage member apply pressure in a direction perpendicular to the penetration direction of the tubular portion and hermetically seal the downstream passage, and the support portion abuts a region on a side of a surface of the sealing member, the surface being opposite the upstream passage member, the region overlapping a region to which the sealing member and the upstream passage member apply pressure.

According to the first aspect, since pressure is applied in the penetration direction of a connection passage due to the hermetic sealing of the upstream passage member and the sealing member, which involves no fitted connection, positioning may easily be performed and assembly may be improved. In addition, since the pressure in the penetration direction may be supported by the support portion, it is possible to suppress application of the pressure in the penetration direction to the liquid ejecting head. Further, since the downstream passage member and the sealing member are hermetically sealed in the direction perpendicular to the penetration direction, it is possible to suppress application of pressure in the penetration direction.

According to a second aspect of the invention, a liquid ejecting apparatus includes the liquid ejecting head unit according to the first aspect of the invention.

According to the second aspect, it is possible to implement a liquid ejecting apparatus that enables passages to be connected preferably and improves assembility.

BRIEF DESCRIPTION OF THE DRAWINGS

The invention will be described with reference to the accompanying drawings, wherein like numbers reference like elements.

DESCRIPTION OF EXEMPLARY EMBODIMENTS

The invention is described in detail below based on embodiments.

First Embodiment

Figure 1:
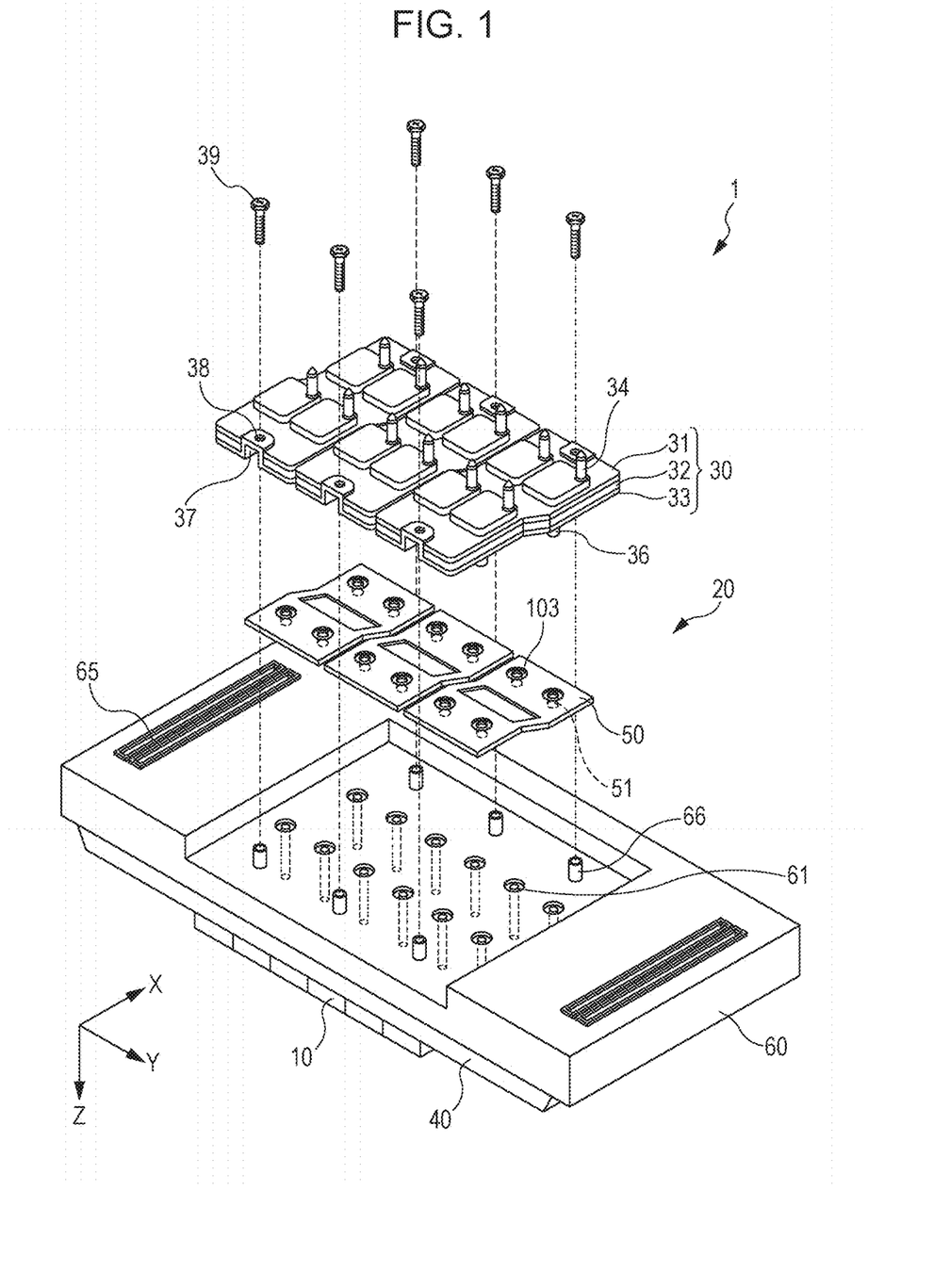
FIG. 1 is an exploded perspective view of a head unit according to a first embodiment of the invention.
Figure 2:
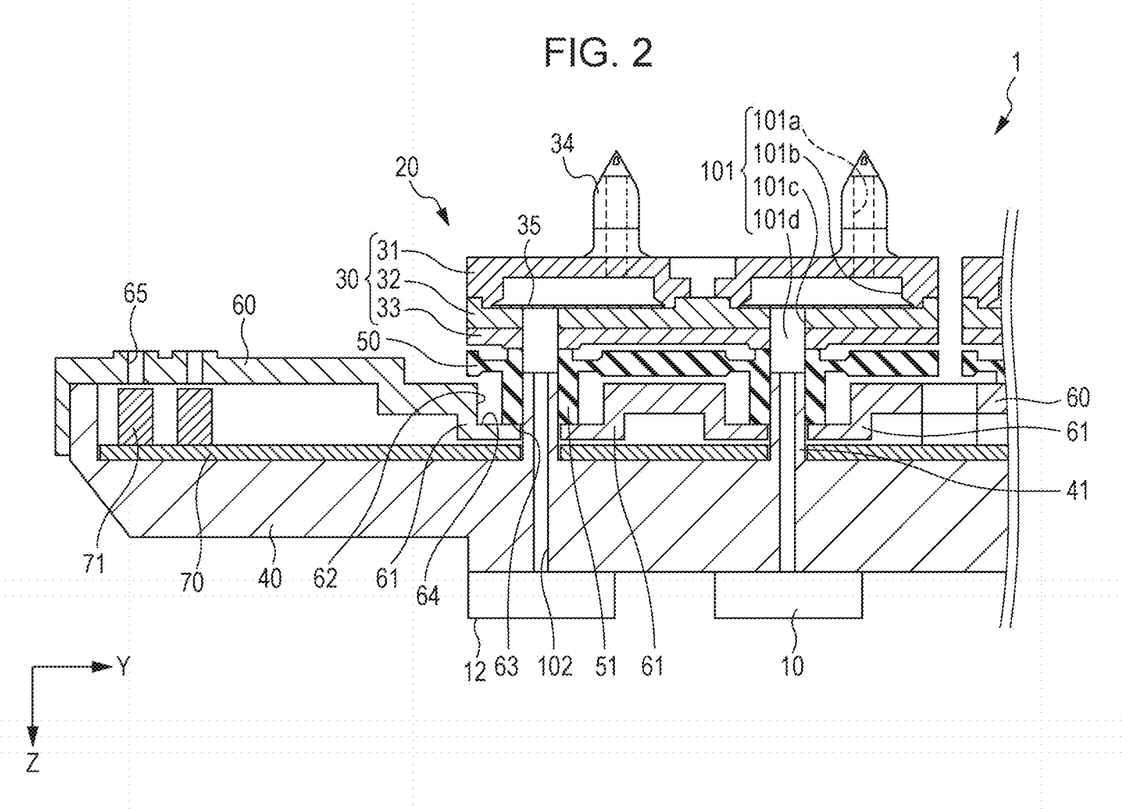
FIG. 2 is a cross-sectional view of the head unit according to the first embodiment of the invention.
Figure 3:
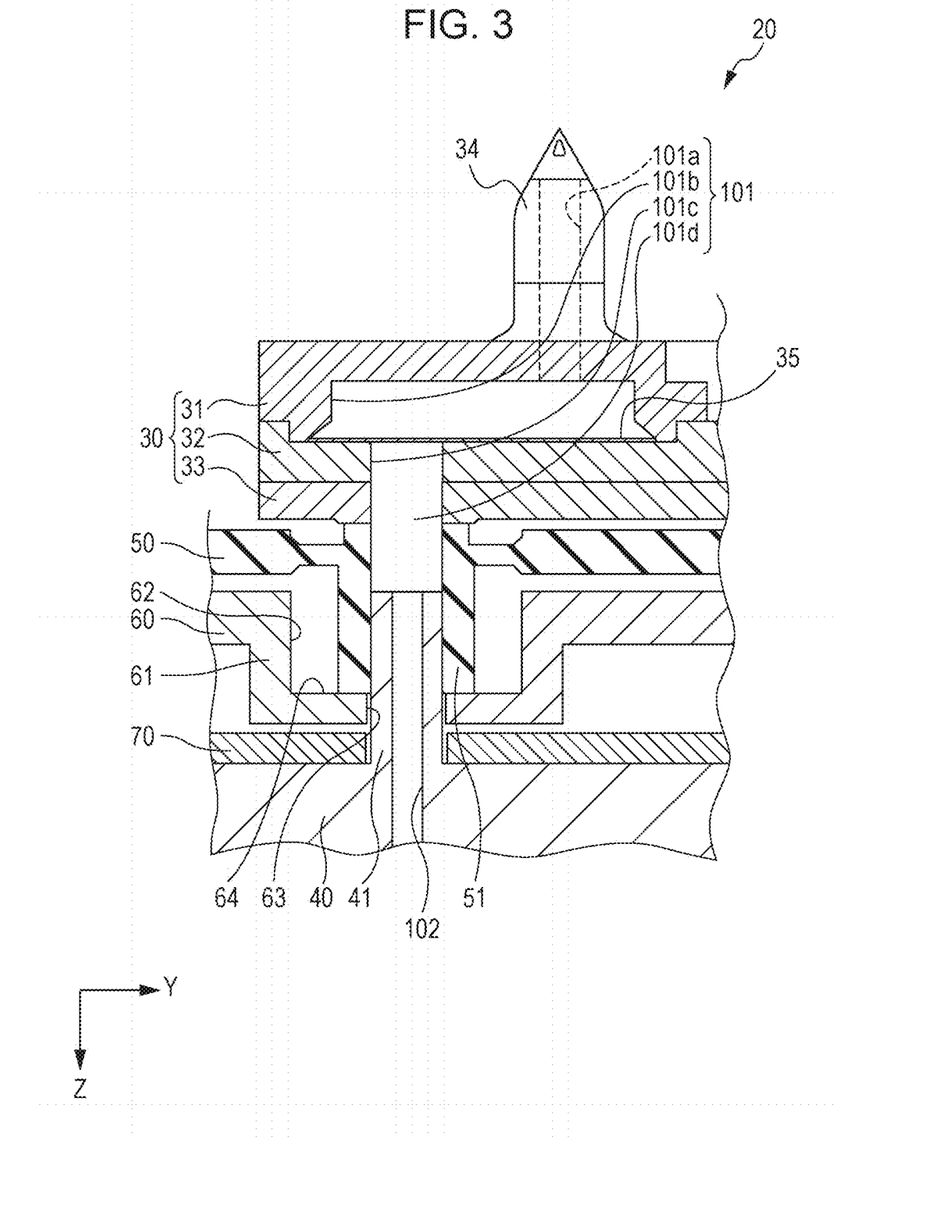
FIG. 3 is a cross-sectional view in which a main part of the head unit according to the first embodiment of the invention is enlarged.

FIG. 1 is an exploded perspective view of an ink jet recording head unit, which is an example of a liquid ejecting head unit according to a first embodiment of the invention. FIG. 2 is a cross-sectional view of the ink jet recording head unit. FIG. 3 is a cross-sectional view in which a main part of FIG. 2 is enlarged.

As illustrated, an ink jet recording head unit 1, which is hereinafter also referred to merely as the head unit 1 and is an example of the liquid ejecting head unit according to the present embodiment, includes a plurality of ink jet recording heads 10, which are hereinafter also referred to merely as the recording heads 10 and discharge drops of ink from nozzles, and a passage member 20, which holds the plurality of recording heads 10 and is provided with a liquid passage that supplies liquid to the recording heads 10.

The recording head 10 includes a liquid ejecting surface 12 on one side, through which the nozzles that discharges drops of ink as liquid are opened. The liquid ejecting surface 12 of the present embodiment is provided with two nozzle rows that are not particularly illustrated but are arranged in a direction that crosses the direction in which the nozzles are arranged side by side. In the present embodiment, the direction in which the nozzles are arranged side by side in each nozzle row is referred to as a first direction X, and the direction in which the nozzle rows are formed so as to cross the first direction X is referred to as a second direction Y.

The inside of the recording head 10, which is not illustrated, is provided with a passage that communicates with the nozzles and communicates with the liquid passage of the passage member 20, a pressure generating portion that causes change in pressure for the ink in the passage, and the like. Examples of the pressure generating portion that is usable include a unit that causes drops of ink to be discharged from nozzles by changing the capacity of a passage using deformation of a piezoelectric actuator that contains a piezoelectric material with an electromechanical transduction function and bringing a change in pressure to the ink in the passage, a unit that causes drops of ink to be discharged from nozzles by arranging a heating element in a passage and using bubbles caused by the heat from the heating element, and a so-called electrostatic actuator, which causes drops of ink to be discharged from nozzles by generating electrostatic force between a vibrating plate and an electrode and deforming the vibrating plate using the electrostatic force.

A surface of the recording head 10 opposite the liquid ejecting surface 12 is fixed to the passage member 20, and the ink held in a liquid retaining portion, such as an ink cartridge or an ink tank, is supplied through the passage member 20. The passage member 20 is provided with the plurality of recording heads 10. In the present embodiment, the passage member 20 is provided with two rows of the recording heads 10 arranged in the first direction X and in each of the two rows, six of the recording heads 10 are arranged side by side in the second direction Y in which the nozzle rows are formed. That is, a total of 12 nozzle rows are arranged in parallel in the second direction Y in one head unit (the head unit 1). Further, in the present embodiment, a direction in which the passage member 20 and the recording heads 10 are fixed is referred to as a third direction Z. That is, the direction in which the passage member 20 and the recording heads 10 are fixed indicates the layer direction and also indicates the direction perpendicular to the plane direction of the liquid ejecting surface 12, which is an in-plane direction of the first direction X and the second direction Y.

The method of fixing the recording heads 10 and the passage member 20 is not particularly limited. For example, the recording heads 10 and the passage member 20 may be bonded by a bonding agent or fixed with screws or the like. Since the recording head 10 is small in size and it is necessary to attach the plurality of recording heads 10 to one passage member, which is the passage member 20, use of a sealing member made of an elastic material is unsuitable for fixing the recording heads 10 and the passage member 20. Accordingly, it is preferable to bond the recording heads 10 and the passage member 20 using a bonding agent.

The passage member 20 to which the recording heads 10 are fixed includes an upstream passage member 30 provided with an upstream passage 101 to which the liquid retaining portion is connected, a downstream passage member 40 provided with a downstream passage 102 that communicates with the upstream passage 101, and a sealing member 50 that is provided between the upstream passage member 30 and the downstream passage member 40 and hermetically seals the connection portion of the upstream passage 101 and the downstream passage 102, and a support member 60 provided with a support portion 61 that supports the sealing member 50. That is, the liquid passage of the passage member 20 includes the upstream passage 101 and the downstream passage 102.

In the present embodiment, a first upstream passage member 31, a second upstream passage member 32, and a third upstream passage member 33 are provided so as to form layers in the third direction Z and make up the upstream passage member 30. The upstream passage member 30 is not particularly limited to this structure but may be a single member or may be made up of two or more members. The layer direction of the plurality of members that make up the upstream passage member 30 is not particularly limited, either, but may be in the first direction X or the second direction Y.

The first upstream passage member 31 is provided with a connection portion 34 on the side of a surface opposite the downstream passage member 40, and the connection portion 34 is connected to the liquid retaining portion in which the ink (liquid) is held. In the present embodiment, the connection portion 34 projects like a needle, which is connected to the liquid retaining portion. The liquid retaining portion, such as an ink cartridge, may be directly connected to the connection portion 34, or the liquid retaining portion, such as an ink tank, may be connected to the connection portion 34 through a supply pipe, such as a tube. The inside of the connection portion 34 is provided with a first upstream passage 101a through which the ink is supplied from the liquid retaining portion. The downstream side of the first upstream passage 101a is provided with a liquid accumulation portion 101b with an inner diameter that is largely widened compared to the first upstream passage 101a in the connection portion 34.

The second upstream passage member 32 is fixed on the side of a surface of the first upstream passage member 31, which is opposite the connection portion 34, and includes a second upstream passage 101c that communicates with the first upstream passage 101a. An opening portion of the second upstream passage 101c of the second upstream passage member 32 is provided with a filter 35 for removing an air bubble or a foreign substance contained in the ink, and the ink supplied from the first upstream passage 101a (the liquid accumulation portion 101b) is supplied to the second upstream passage 101c through the filter 35. Depending on the positions of the first upstream passage 101a and a third upstream passage 101d, which is described below, the second upstream passage 101c may be any one of a passage that extends in the third direction Z in which the first upstream passage member 31 and the second upstream passage member 32 form layers, a passage that extends in the direction perpendicular to the third direction Z, that is, a passage that extends in a plane including the first direction X and the second direction Y, and the like.

The third upstream passage member 33 is provided on a side of the second upstream passage member 32, which is opposite the first upstream passage member 31. The third upstream passage member 33 is provided with the third upstream passage 101d that communicates with the second upstream passage 101c of the second upstream passage member 32. That is, the upstream passage 101 includes the first upstream passage 101a, (the liquid accumulation portion 101b) the second upstream passage 101c, and the third upstream passage 101d. The third upstream passage 101d is opened at one end on the side of the second upstream passage member 32 and communicates with the second upstream passage 101c. Further, the third upstream passage 101d is provided so as to be opened at the other end on the side of the downstream passage member 40. The cross section of the upstream passage 101 is not limited to a circular shape but may be an elliptic shape, a rectangular shape, or the like.

For example, the first upstream passage member 31, the second upstream passage member 32, and the third upstream passage member 33, which include the upstream passage 101, are integrally arranged in layers using a bonding agent, by welding, or the like. Although the first upstream passage member 31, the second upstream passage member 32, and the third upstream passage member 33 may be fixed with screws, clamps, or the like, it is preferable to join the first upstream passage member 31, the second upstream passage member 32, and the third upstream passage member 33 with a bonding agent, by welding, or the like so as to suppress leakage of the ink (liquid) from the connection portion from the first upstream passage 101a to the third upstream passage 101d.

The third upstream passage member 33 is further provided with a depressed portion 37 that is opened on the side of the downstream passage member 40. A bottom surface of the depressed portion 37, that is, the surface on the side of the first upstream passage member 31 is provided with a fixing hole 38 that penetrates in the thickness direction. When a fixing portion 66 provided to the support member 60, which is described in detail below, so as to project on the side of the upstream passage member 30 is inserted into the depressed portion 37 and a fixing screw 39 is inserted into the fixing hole 38 so as to be threadedly engaged with the fixing portion 66, the upstream passage member 30 is fixed to one surface of the support member 60.

In the present embodiment, one upstream passage member, which is the upstream passage member 30, is provided with four connection portions, which are the connection portions 34, and the one upstream passage member 30 is provided with four independent upstream passages, which are the upstream passages 101. Although the present embodiment exemplifies a structure in which one upstream passage member (the upstream passage member 30) is provided with four independent upstream passages (the upstream passages 101), the structure is not particularly limited to this but, for example, the upstream passage 101 may branch into two after passing through the filter 35 from the side of the connection portion 34. Not to mention, the upstream passage 101 may branch into three after passing through the filter 35. The one upstream passage member 30 is further provided with two of the fixing holes 38 and is fixed to the support member 60 with the fixing screws 39 at two positions. In the present embodiment, the number of upstream passage members (the upstream passage members 30) provided to one head unit (the head unit 1) is three. Not to mention, the method of fixing the upstream passage members 30 to the support member 60 is not limited to the fastening with screws but may be, for example, bonding with a bonding agent or the like. In the present embodiment, it is possible to easily attach/detach the upstream passage members 30 to/from the support member 60 by fixing the upstream passage members to the support member 60 with the fixing screws 39. Accordingly, it is possible to replace only the upstream passage member 30 and improve a yield compared to a case in which the passage member 20 is replaced as a whole. Moreover, since it is possible to easily attach/detach the upstream passage members 30 to/from the support member 60, reverse cleaning or the like may be easily performed, in which a foreign substance in the upstream passage 101 or on the filter 35 by causing a cleaning liquid to flow backward through the upstream passage 101 of the upstream passage member 30, or the like.

In the support member 60, the upstream passage members 30 are fixed to one surface in the third direction Z and the downstream passage member 40 is fixed to the other surface. In addition, the sealing member 50, which serves as a connecting unit that connects the upstream passage 101 of the upstream passage member 30 and the downstream passage 102 of the downstream passage member 40, is provided between the support member 60 and the upstream passage member 30.

The sealing member 50 has a resistance to liquid, such as the ink used in the head unit 1, and may be made of an elastically-deformable material (an elastic material), such as a rubber or an elastomer. The sealing member 50 includes a tubular portion 51 for each of the upstream passages 101. The inside of the tubular portion 51 is provided with a connection passage 103. In addition, the upstream passage 101 of the upstream passage member 30 and the downstream passage 102 of the downstream passage member 40 are allowed to communicate through the connection passage 103 of the tubular portion 51 as described in detail below. The tubular portion 51 is fitted around the rim of the projecting portion 41 of the downstream passage member 40, which is described in detail below. Since the projecting portion 41 has a cylindrical shape in the present embodiment, the cross section of the connection passage 103 has a circular shape and a shape in which the thickness is approximately the same along the circumferential direction, that is, the connection passage 103 has a cylindrical shape. A plate-like portion couples the tubular portions 51 on the side of the upstream passage member 30 so that the plurality of tubular portions 51 are integrated with one of the upstream passage members 30. Since each of the upstream passage members 30 is provided with four upstream passages in the present embodiment, the sealing member 50 that is integrally provided with the four tubular portions 51 is employed. Since in the present embodiment, one passage member (the passage member 20) is provided with three upstream passage members (the upstream passage members 30), the number of sealing members (the sealing members 50) that are provided is the same as the number of upstream passage members (the upstream passage members 30), that is, three.

The plate-like portion that couples the tubular portions 51 is formed so as to have a thickness that is smaller than the thicknesses of the other regions over the periphery of the tubular portion 51. Thus, as is described in detail below, when one surface of the sealing member 50 is caused to abut the surface of the upstream passage member 30 through which the upstream passage 101 is opened, only an end surface of the tubular portion 51 abuts the periphery of the opening of the upstream passage 101 and it is possible to increase the pressure for the hermetic sealing by reducing the abutting area and suppress the leakage of the ink (liquid).

The connection passage 103 of the tubular portion 51 has an inner diameter approximately the same as the inner diameter of the opening of the upstream passage 101 of the upstream passage member 30. The tubular portion 51 is formed so as to have an outer diameter that is larger than the inner diameter of the upstream passage 101. Accordingly, the upstream passage 101 and the connection passage 103 are allowed to communicate by causing the surface of the upstream passage member 30 through which the upstream passage 101 is opened and the end surface of the tubular portion 51 through which the connection passage 103 is opened to abut each other in the penetration direction of the connection passage 103, that is, in the third direction Z. In other words, the upstream passage 101 and the connection passage 103 are connected in a state in which the upstream passage member 30 and the sealing member 50 are hermetically sealed by applying pressure in the penetration direction of the connection passage 103 (the third direction Z).

When the end surface of the tubular portion 51 of the sealing member 50 and the surface of the upstream passage member 30 through which the upstream passage 101 is opened are caused to abut each other with predetermined pressure in the third direction Z, the tubular portion 51 of the sealing member 50 is elastically deformed toward the recording head 10 in the third direction Z. Thus, the support member 60 is provided with the support portion 61 so as to abut the other end surface of the tubular portion 51 of the sealing member 50, which is opposite the end surface that abuts the upstream passage member 30, and support the tubular portion 51 in the third direction Z.

Specifically, the inside of the support portion 61 is provided with a tubular portion insertion hole 62, which has a tubular shape and in which the tubular portion 51 of the sealing member 50 is inserted on the side of the upstream passage member 30, and a projecting portion insertion hole 63, in which the projecting portion 41 of the downstream passage member 40 is inserted on the side of the downstream passage member 40.

The tubular portion insertion hole 62 has an inner diameter larger than the outer diameter of the tubular portion 51 and is formed so that the tubular portion 51 may easily be inserted/extracted from one side.

The projecting portion insertion hole 63 has an inner diameter that is slightly larger than the outer diameter of the projecting portion 41 of the downstream passage member 40 and smaller than the outer diameter of the tubular portion 51 of the sealing member 50. Thus, a level difference 64, which is caused by the difference in inner diameter, is formed inside the support portion 61 and between the tubular portion insertion hole 62 and the projecting portion insertion hole 63.

When the tubular portion 51 of the sealing member 50 is inserted in the tubular portion insertion hole 62 of the support portion 61, the end surface of the tubular portion 51, which is the other end surface opposite the end surface that abuts the upstream passage member 30, abuts the level difference 64 and as a result, a move in the insertion direction (the third direction Z) may be suppressed. That is, in the present embodiment, one end surface of the tubular portion 51 of the sealing member 50 abuts the upstream passage member 30 and the connection portion of the upstream passage 101 and the connection passage 103 is hermetically sealed, and the other end surface of the tubular portion 51 abuts the level difference 64 of the support portion 61 to be supported. Thus, since the upstream passage member 30 is fixed to the support member 60, even when the tubular portion 51 of the sealing member 50 is pressed toward the downstream passage member 40, the repulsion caused by the elastic deformation of the sealing member 50 is supported by the support portion 61 of the support member 60. As a result, no repulsion of the sealing member 50 is applied toward the downstream passage member 40, and the upstream passage member 30 and the sealing member 50 abut each other while being pressed with predetermined pressure.

Since one end surface of the tubular portion 51 abuts the upstream passage member 30 and the other end surface abuts the level difference 64 of the support portion in this manner, the support portion 61 (the level difference 64) abuts a region to which the sealing member 50 (the tubular portion 51) on the side opposite the surface that abuts the upstream passage member 30 and the upstream passage member 30 apply pressure, that is, a position that overlaps the region in which the upstream passage member 30 and the sealing member 50 abut each other and perform the hermetic sealing. That the support portion 61 (the level difference 64) abuts a position that overlaps the region to which the sealing member 50 (the tubular portion 51) and the upstream passage member 30 apply pressure is rephrased as follows: when projection is performed in the third direction Z on the region in which the upstream passage member 30 and the tubular portion 51 of the sealing member 50 abut each other and on the region supported by the support portion 61 (the level difference 64) and the sealing member 50 abutting each other, the positions of the regions overlap each other. Since the tubular portion 51 pressed by the upstream passage member 30 is supported by the support portion 61 on an axis in the third direction Z in this manner, it is possible to suppress occurrence of deformation of the tubular portion 51, such as distortion in the first direction X or the second direction Y. If the region in which the upstream passage member 30 presses the tubular portion 51 and the region that the support portion 61 supports (the region that the level difference 64 abuts) are positioned so as not to overlap each other when undergoing the projection in the third direction Z, the tubular portion 51 may be distorted and deformed in the first direction X and the second direction Y and as a result, the ink (liquid) may leak from the connection portion of the upstream passage 101 and the connection passage 103 or the connection portion of the connection passage 103 and the downstream passage 102. In the present embodiment, the region in which the upstream passage member 30 and the tubular portion 51 of the sealing member 50 abut each other and the region supported by the support portion 61 (the level difference 64) and the tubular portion 51 of the sealing member 50 that abut each other are positioned so as to overlap each other when undergoing the projection in the third direction Z. Thus, it is possible to suppress distortion and deformation of the tubular portion 51 and suppress leakage of the ink in the connection portion of each passage.

The downstream passage member 40 is fixed on the side of a surface of the support member 60, which is opposite the upstream passage member 30. The recording head is fixed on the side of a surface of the downstream passage member 40, which is opposite the support member 60.

The downstream passage member 40 is provided with the downstream passage 102 that communicates with the upstream passage 101 of the upstream passage member 30. The downstream passage 102 is provided so as to be opened at one end through the surface to which the recording head 10 is fixed and be opened at the other end through the top end surface of the projecting portion 41 that is tubular and is provided so as to project on the side of the upstream passage member 30.

As described above, the projecting portion 41 has an outer diameter that is slightly smaller than the inner diameter of the projecting portion insertion hole 63 of the support portion 61, and is inserted in the projecting portion insertion hole 63 of the support portion 61. The tubular portion 51 of the sealing member 50 inserted in the tubular portion insertion hole 62 is fitted around the rim of the projecting portion 41 inserted in the projecting portion insertion hole 63 and thus, the downstream passage 102 and the connection passage 103 of the tubular portion 51 are connected. Accordingly, the upstream passage 101 and the downstream passage 102 are connected (linked together) through the connection passage 103. The inner diameter of the connection passage 103 is slightly smaller than the outer diameter of the projecting portion 41, and when the sealing member 50 (the tubular portion 51) is elastically deformed so as to widen the inner diameter, the inner surface of the connection passage 103 comes into intimate contact with the outer circumferential surface of the projecting portion 41 in a state in which pressure is applied in the directions perpendicular to the penetration direction of the connection passage 103 (the third direction Z), that is, in the first direction X and the second direction Y. In other words, the upstream passage 101 and the connection passage 103 are hermetically sealed in a state in which pressure is applied in the radial direction of the connection portion (the connection passage 103). The radial direction of the connection portion of the upstream passage 101 and the downstream passage 102 (the radial direction of the connection passage 103) is in the direction that crosses the direction in which the ink passes (the penetration direction through the connection passage 103), and is, in the present embodiment, in the plane direction including the first direction X and the second direction Y. Although the upstream passage 101 and the downstream passage 102 are provided so that the ink flows along the third direction Z in the present embodiment, the structure is not particularly limited to this but any one or both of the upstream passage 101 and the downstream passage 102 may be provided in the direction that crosses the third direction Z. In this case, the radial direction of the upstream passage 101 and the downstream passage 102 is in the direction that crosses the plane direction including the first direction X and the second direction Y.

In this manner, the sealing member 50 (the tubular portion 51) that hermetically seals the connection portion of the downstream passage 102 of the downstream passage member 40 applies pressure in the radial direction of the downstream passage 102, that is, in the direction perpendicular to the third direction Z to perform the hermetic sealing. As a result, the sealing member 50 is elastically deformed in the direction perpendicular to the plane direction of the liquid ejecting surface 12, that is, in the third direction Z and the repulsion may suppress a press against the recording head 10. Accordingly, it is possible to suppress separation of the recording head 10 from the passage member 20, separation of a layer member arranged in layers in the third direction Z, which is not illustrated but is a constituent of the recording head 10, and occurrence of warping on the liquid ejecting surface 12 of the recording head 10, and it is possible to suppress deviation from the positions at which the drops of ink are expected to be supplied from the nozzles to an ejected medium, which may be caused by the warping of the liquid ejecting surface 12.

As described above, the sealing member 50 that hermetically seals the connection portion of the upstream passage 101 of the upstream passage member 30 applies pressure in the direction in which the ink flows through the upstream passage 101, that is, in the third direction Z to perform the hermetic sealing. However, since in the present embodiment, the support portion 61 is caused to support the region in which the upstream passage member 30 of the sealing member 50 presses the sealing member 50 in the third direction Z, the pressure with which the upstream passage member 30 presses the sealing member 50 in the third direction Z is supported by the support portion 61. The support member 60 that has the support portion 61 is fixed in a region in which the support member 60 does not overlap the downstream passage member 40 or the nozzles when undergoing projection. Thus, the pressure with which the upstream passage member 30 presses the sealing member 50, which is the repulsion caused by the elastic deformation, is supported by the support portion 61 and dispersed to a fixing region in which the support member 60 that has the support portion 61 and the downstream passage member 40 are fixed. Accordingly, it is possible to suppress application of the pressure against the sealing member 50 particularly to the periphery of the nozzles of the recording head 10. As a result, it is possible to suppress separation of a member that is a constituent of the recording head 10, separation of the passage member 20 and the recording head 10, deviation from the positions at which the drops of ink are expected to be supplied, which is caused by the warping of the liquid ejecting surface of the recording head 10, and the like.

Further, when the upstream passage member 30 and the sealing member 50 are connected while applying pressure in the direction in which the ink flows, that is, in the third direction Z, relative positioning and connection of the upstream passage member 30 and the sealing member 50 may be performed easily. If the upstream passage 101 is provided in a projecting portion shaped like a cylinder, similar to the downstream passage 102, and the tubular portion 51 of the sealing member 50 is fitted around the rim of the projecting portion so as to connect the upstream passage 101 and the connection passage 103, the plurality of projecting portions 41 need to be inserted in the tubular portions 51 of the sealing member 50 at the same time and workability decreases. Particularly, it is difficult to visually check the connection portion of the upstream passage member 30 and the sealing member 50 because the support member 60 or the like hides the connection portion and thus, it may be impossible to check the accuracy of the connection. Besides, when an error occurs between the positions of the plurality of projecting portions and the positions of the plurality of tubular portions 51, the tubular portion 51 needs to be bent and a malfunction, such as leakage of the ink, may be caused by the poor sealing. Since in the present embodiment, the plane of the upstream passage member 30 and the plane of the sealing member 50 are caused to abut each other in the third direction Z, pressure is applied in the third direction Z, and the upstream passage 101 and the connection passage 103 are allowed to communicate, the positioning may be performed easily without any visual check. In addition, even when an error occurs at the position of each of the tubular portions 51 relative to the plurality of upstream passages 101, it is possible to reduce application of force in the direction in which the tubular portion 51 is bent and suppress leakage of the ink caused by the poor sealing.

In a method of manufacturing the head unit 1 described above, the downstream passage member 40 and the support member 60 are fixed first, and then the tubular portion 51 of the sealing member 50 is fitted around the projecting portion 41 provided with the downstream passage 102. After that, the upstream passage member 30 is positioned so that the opening of the upstream passage 101 matches the tubular portion 51 of the sealing member 50 (the opening of the connection passage 103), and the upstream passage member 30 is fixed to the support member 60. Thus, poor sealing of the upstream passage 101, the connection passage 103, and the downstream passage 102 may be suppressed while performing positioning and assembling easily. Although the connection passage 103 and the downstream passage 102 may be connected after the upstream passage 101 and the connection passage 103 have been connected, as described above, it is difficult and not preferable to cause the tubular portions 51 to be fitted around the plurality of projecting portions 41 without performing visual check.

In the present embodiment, further, a wiring substrate 70 is provided between the downstream passage member 40 and the support member 60. The wiring substrate is provided with wiring that is not particularly illustrated but is connected to a pressure generating portion provided to the recording head 10, or the like. The wiring substrate 70 is further provided with a connector 71, and external wiring into which a wiring connection hole 65 provided to the support member 60 penetrates, which is not illustrated, is connected to the connector 71. When the wiring substrate 70 is provided in the passage member 20 in this manner, the wiring may suffer a short circuit if the wiring substrate 70 comes into contact with the ink. Thus, it is necessary to suppress particularly the leakage of the ink (liquid) from the connection portion of the upstream passage 101 and the downstream passage 102. Since in the present embodiment, the connection portion of the upstream passage 101 and the downstream passage 102 is sealed using the sealing member 50 and the support portion 61 is provided, the connection portion of the upstream passage 101 and the downstream passage 102 may be hermetically sealed with high pressure while suppressing the application of the pressure in the third direction Z to the recording head 10. Accordingly, leakage of the ink may be suppressed and occurrence of a malfunction, such as a short circuit of the wiring, may be suppressed.

Another Embodiment

Although one embodiment of the invention is described above, the basic structure of the invention is not limited to the above-described structures.

For example, although the first embodiment described above exemplifies the sealing member 50 that is integrally provided with the plurality of tubular portions 51, the structure is not particularly limited to this but the tubular portion 51 may be an independent tubular portion for each of the upstream passages 101.

Further, although in the first embodiment described above, the upstream passage member 30 is made up of three members, which are the first upstream passage member 31, the second upstream passage member 32, and the third upstream passage member 33, the upstream passage member 30 may be a single member or may be made up of a plurality of members, the number of which is a number other than three. Similarly, although in the above-described example, the downstream passage member 40 is a single member, the structure is not particularly limited to this but the downstream passage member 40 may be made up of two or more members.

Although the support portion 61 is provided to the support member 60 in the first embodiment described above, the structure is not particularly limited to this but the support portion 61 may be provided as part of the downstream passage member 40 or the upstream passage member 30. When, for example, the support portion 61 is integrally provided to the downstream passage member 40, similar to the first embodiment described above, it is satisfactory for the support portion 61, which includes the support portion 61 integrally formed and supported, to be fixed to the downstream passage member 40 at a position that does not overlap the nozzles of the recording head 10 when undergoing projection in the third direction Z.

Moreover, although the first embodiment described above exemplifies the support portion 61 that has a cylindrical shape, the support portion 61 is not particularly limited to the structure but may be provided to the tubular portion 51 non-continuously in the circumferential direction because it is satisfactory for the support portion 61 to abut an end surface of the tubular portion 51 so that a move of the tubular portion 51 in the third direction Z is restricted. That is, the support portion 61 may be provided with slits or the like at predetermined gaps in the circumferential direction.

Further, although the first embodiment described above exemplifies the passage member 20 that includes the upstream passage member 30 provided with the upstream passage 101 and the downstream passage member 40 provided with the downstream passage 102, when for example, the ink (liquid) is caused to circulate, the upstream side and the downstream side may be reversed. That is, the ink supplied to the recording head 10 may be caused to flow from the downstream passage 102 to the upstream passage 101 to be discharged (circulate) to the liquid retaining portion, a reservoir in which the discharged ink is stored, or the like.

Figure 4:
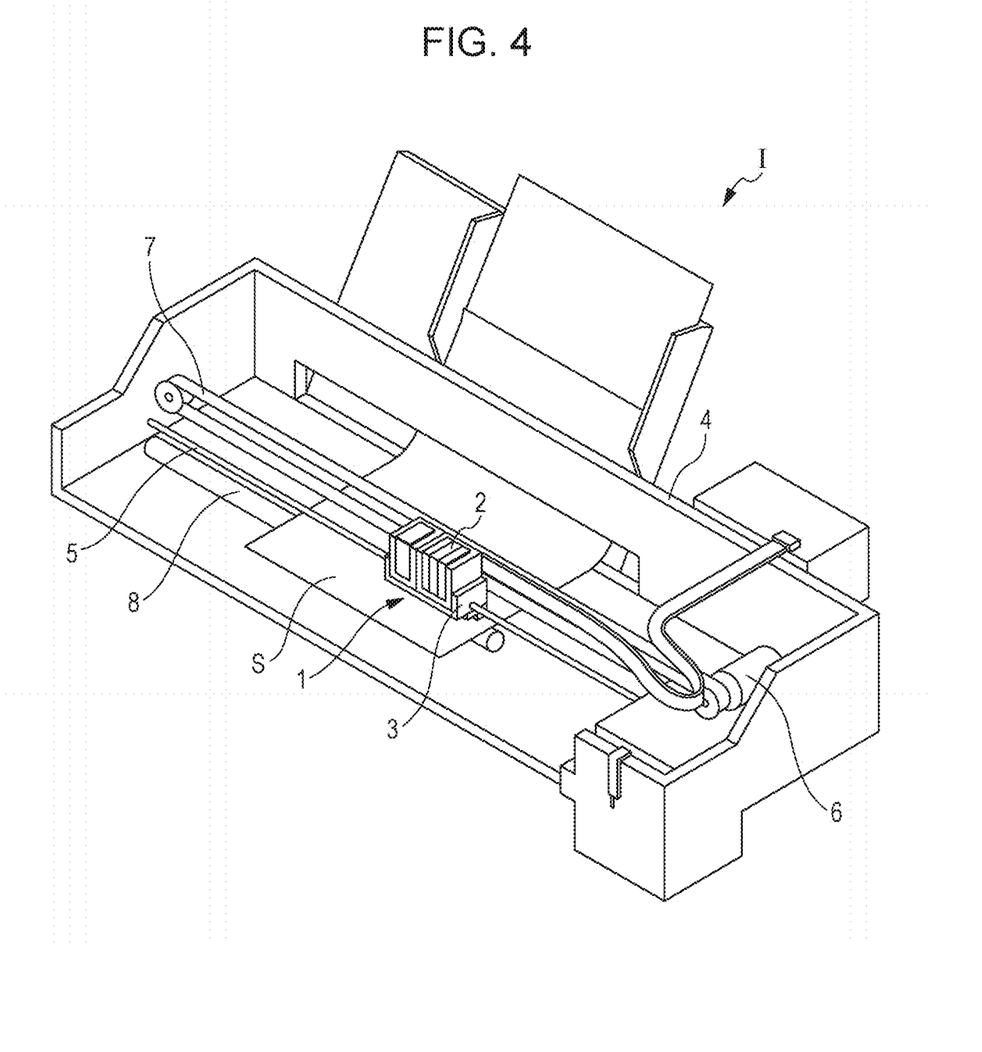
FIG. 4 is a perspective view that illustrates a schematic structure of a recording apparatus according to an embodiment of the invention.

The head unit 1 according to the first embodiment described above is mounted in an ink jet recording apparatus. FIG. 4 is a schematic view that illustrates an example of the ink jet recording apparatus.

In an ink jet recording apparatus I illustrated in FIG. 4, an ink cartridge 2 that serves as the liquid retaining portion is provided to the head unit 1 so as to be attachable/detachable. The head unit 1 provided with the ink cartridge 2 is mounted on a carriage 3. The carriage 3 is provided to a carriage axis 5 attached to an apparatus body 4 so as to be movable in the axis direction.

When driving force of a drive motor 6 is transferred to the carriage 3 through a plurality of gear wheels, which are not illustrated, and a timing belt 7, the carriage 3 with the head unit 1 is moved along the carriage axis 5. The apparatus body 4 is provided with a platen 8 along the carriage axis 5, and a recording sheet S fed as a recording medium by a paper feeding roller not illustrated, such as paper, is wound around the platen 8 to be transported.

Although in the above-described ink jet recording apparatus I exemplified, the head unit 1 is mounted on the carriage 3 and moved in the main scanning direction, the structure is not particularly limited to this but the invention may be applied to, for example, a so-called line recording apparatus in which the head unit 1 is fixed and printing is performed only by moving the recording sheet S, such as paper, in the subscanning direction.

Although the above-described example exemplifies the ink cartridge 2 as the liquid retaining portion, the liquid retaining portion is not particularly limited to an ink cartridge but, for example, an ink tank or the like may be fixed as the liquid retaining portion to the apparatus body 4, and the liquid retaining portion and the head unit 1 may be connected through a supply pipe, such as a tube. That is, the head unit 1 is not limited to the structure in which the liquid retaining portion is directly connected to the connection portion 34 but the liquid retaining portion may be connected to the connection portion 34 through a supply pipe or the like. It is optional to mount the liquid retaining portion in the ink jet recording apparatus I.

The invention is largely aimed at liquid ejecting heads in general and may be applied to, for example, a recording head included in various kinds of ink jet recording heads used in image recording apparatuses, such as printers, a coloring material ejecting head used to manufacture a color filter for a liquid crystal display or the like, an electrode material ejecting head used to form an electrode for an organic electroluminescent (EL) display, a field emission display (FED), or the like, or a bioorganic substance ejecting head used to manufacture a biochip.

The entire disclosure of Japanese Patent Application No. 2013-129336, filed Jun. 20, 2013 is expressly incorporated by reference herein.

What is claimed is:

1. A liquid ejecting head unit comprising:
an upstream passage member that is provided below a liquid retaining member in which a liquid is retained, an upstream passage being provided inside of the upstream passage member, the liquid being supplied to the upstream passage from the liquid retaining member;
a sealing member that is provided below the upstream passage member, an upper surface of the sealing member contacts a lower surface of the upstream passage member, the sealing member being made of an elastic material, a tubular connection passage being provided inside of the sealing member, the tubular connection passage having fluid communication with the upstream passage so as to flowingly convey the liquid supplied from the upstream passage;
a downstream passage member that is configured with a base plate, a tubular protrusion, and a fixing portion, the base plate being provided below the sealing member, a downstream passage being provided inside of the tubular protrusion, the downstream passage having fluid communication with the tubular connection passage and the upstream passage so as to supply the liquid to a liquid electing head that is provided below the downstream passage member;
a support member fixed to the downstream passage member at an edge area of the fixing portion, a support portion and a wiring connection hole being provided at the support member; and
a wiring substrate having a connector, which is configured to connect to an external wiring penetrating the wiring connection hole, the wiring substrate provided on the base plate of the downstream passage member, wherein
the tubular protrusion of the downstream passage member is formed inside of the tubular connection passage so that an outer surface of the tubular protrusion abuts an inner surface of tubular connection passage,
the upstream passage member is hermetically sealed with the sealing member at a first seal part by first pressure applied from the lower surface of the upstream passage member and from the upper surface of the sealing member in an extended direction of the tubular connection passage,
the sealing member is hermetically sealed with the tubular protrusion of the downstream passage member by second pressure applied in a direction perpendicular to the extended direction, and
the support portion abuts a region of the sealing member, the region is a lowest part of the tubular connection passage, and the region is overlapped with the first seal part in a plan view, the region is shifted from the edge area in the plan view, the support portion is apart from the wiring substrate, the support member is configured to disperse the first pressure from the upstream passage member toward the edge area.

2. A liquid ejecting apparatus comprising the liquid ejecting head unit according to claim 1.

3. The liquid ejecting head unit according to claim 1, wherein
the upstream passage member is configured with first and second sub members,
the first sub member is stacked on the second sub member, and
a filter is provided in the upstream passage so that the liquid from the liquid retaining member passes through the filter.

* * * * *